United States Patent
Hoff et al.

(10) Patent No.: US 7,941,175 B1
(45) Date of Patent: May 10, 2011

(54) SIGNAL PRIORITIZATION IN A COMMUNICATIONS SYSTEM

(75) Inventors: Anders Hoff, Hägersten (SE); Anders Lundström, Karlstad (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 09/467,420

(22) Filed: Dec. 20, 1999

(51) Int. Cl.
*H04Q 7/20* (2006.01)

(52) U.S. Cl. ......... 455/527; 455/453; 455/512; 455/515

(58) Field of Classification Search .................. 455/512, 455/513, 527, 528, 453, 450–452, 515, 516, 455/464, 509; 370/439, 444
See application file for complete search history.

(56) References Cited

U.S. PATENT DOCUMENTS

| | | | | |
|---|---|---|---|---|
| 5,533,094 A | | 7/1996 | Sanmugam | 379/57 |
| 5,537,684 A | * | 7/1996 | Cassidy et al. | 455/527 |
| 5,570,411 A | | 10/1996 | Sicher | 379/57 |
| 5,574,977 A | * | 11/1996 | Joseph et al. | 455/527 |
| 5,625,629 A | | 4/1997 | Wenk | 370/347 |
| 5,917,806 A | | 6/1999 | Lin et al. | 370/237 |
| 5,956,644 A | * | 9/1999 | Miller et al. | 455/453 |
| 6,009,331 A | * | 12/1999 | Ueda | 455/450 |

FOREIGN PATENT DOCUMENTS

EP 104402 5/2000

OTHER PUBLICATIONS

I. Rubin et al., "Impact of the Location Area Structure on the Performance of Signaling Channels in Wireless Cellular Networks", *IEEE Communications Magazine, U.S.*, IEEE Service Center, Piscataway, N.J., vol. 35, No. 2, pp. 108-115, XP000683409, Feb. 1997.
Woldemar F. Fuhrmann et al., "Performance Aspects of the GSM Radio Subsystem", *Proceedings of the IEEE*, U.S., IEEE, New York, vol. 82, No. 9, Sep. 1994, pp. 1449-1465, XP000474896.

* cited by examiner

*Primary Examiner* — Vivian Chin
*Assistant Examiner* — Duc Nguyen (57) ABSTRACT

A method, system, and apparatus enables lower priority (e.g., access response) messages to be transmitted instead of higher priority (e.g., paging) messages when the lower priority messages become too backlogged in an environment in which the two types of messages share a given capacity. In other words, when an overload situation is detected, the shared capacity is regulated by ensuring that the lower priority messages have at least some bandwidth. For example, if (i) the lower priority messages reach a predetermined number or (ii) a particular lower priority message has been waiting a predetermined period of time, then at least a portion of the higher priority messages are diverted (e.g., delayed or deleted). In one embodiment, the higher priority messages that are initially diverted are a lowest priority subset of the higher priority messages. In another embodiment, a highest priority subset of the lower priority messages are transmitted first as capacity is made available.

24 Claims, 5 Drawing Sheets

| STAGE | PAGING MESSAGE(S) DIVERTED ||
|---|---|---|
| FIRST | (a) MWI | (b) VOICE PAGE-THIRD ATTEMPT |
| SECOND | (a) SMS | (b) VOICE PAGE-SECOND ATTEMPT |
| THIRD | ALL PAGES (including VOICE PAGE-FIRST ATTEMPT) ||

(Priority: LOWER ↔ HIGHER)

*FIG. 6A*

| PRIORITY | ACCESS RESPONSE MESSAGE(S) DIVERTED ||
|---|---|---|
| HIGHER | (a) DTC DESIGNATION | (b) VOICE CHANNEL DESIGNATION |
| ⋮ | ⋮ | ⋮ |
| LOWER | REGISTRATION ACCEPT ||

SIGNAL PRIORITIZATION IN A COMMUNICATIONS SYSTEM

BACKGROUND OF THE INVENTION

1. Technical Field of the Invention

The present invention relates in general to the field of communication systems, and in particular, by way of example only, to prevention of signaling traffic overload within a cellular communication system employing a location management scheme.

2. Description of Related Art

Modern cellular communication systems, such as cellular communication systems based on IS-136 specifications, typically employ a location management scheme that enables the cellular network to quickly locate a target mobile station in response to an incoming call. In a zone-based location management scheme, for example, the cellular coverage area is divided into non-overlapping location areas, where each location area may include one or more individual cells. When a mobile station powers up or enters a new location area, the mobile station initiates a location update request or registration over a reverse access channel associated with the serving base station. The cellular network then accesses the Home Location Register associated with the mobile station and updates the stored indication of the mobile station's current location. When the cellular network receives an incoming call addressed to a target mobile station, the cellular network usually broadcasts a paging message over forward control channels associated with all the base stations within the target mobile station's last updated location area. The target mobile station responds by transmitting an acknowledgment message over the serving base station's reverse access channel, thereby enabling the cellular network to identify the base station currently serving the target mobile station and to route the incoming call accordingly.

The forward control channel(s) of cellular networks are conventionally used for other messages besides paging messages. In other words, the forward control channel(s) are typically shared among many different types of messages that are transmitted from the cellular network to one or more mobile stations. For example, access response messages may share the forward control channel(s) with paging messages. An access response message is a message sent from the cellular network to a specific mobile station that has previously requested access to the cellular network (e.g., a specific mobile station that has requested initiation of a phone call).

In order to complete an incoming call in a timely fashion, among other reasons, paging messages are frequently given priority over access response messages. Unfortunately, one resulting significant problem associated with cellular communication systems is that paging messages may supplant access response messages. One particularly onerous result of this situation is that the forward control channel may become so congested with paging messages that access response messages cannot be transmitted. Consequently, a base station's forward control channel can become completely consumed with the sending of paging messages to mobile stations that are not even within the cell associated with the base station (e.g., because the paged mobile stations are within cells associated with other base stations that belong to the same location area). Meanwhile, mobile stations within the base station's cell that are attempting to establish a call, and hence actively receiving and detecting messages in an attempt to detect an access response message, may be unable to do so. Base station resources that are still available (e.g., traffic channels) may therefore go unused. Because congestion of forward control channel(s) results in lost calls from unsuccessful call setups, the efficient management of the forward control channel(s) is critical for providing reliable mobile service to mobile stations traveling within the serving coverage area.

An existing approach used in the Personal Digital Cellular Standard (PDC) of Japan (RCR STD-27F) (formerly called the Japanese Digital Cellular System (JDC)) relies on reserved capacity for access response messages and paging messages. In PDC systems, paging messages can consequently never occupy the total capacity. Under the TIA/EIA-136 standard, on the other hand, paging messages can occupy the total capacity. Using a fixed (or slow) assignment of resources, as is done in PDC, is a less than optimal manner for handling traffic capacity. For example, paging messages may become backed up, which causes incoming calls to be lost, while excess capacity reserved for access response messages goes unused. Permitting the entire capacity to be used for paging, as is done in TIA/EIA-136, can cause a mobile that has already contacted the network and is waiting for a response to never receive one. For example, if the entire forward control channel capacity is occupied with higher priority paging messages, then no lower priority access response messages will be transmitted.

SUMMARY OF THE INVENTION

The deficiencies of the prior art are overcome by the method, system, and apparatus of the present invention. For example, as heretofore unrecognized, it would be beneficial to flexibly allocate and/or prioritize paging and access response messages with respect to each other responsive to relevant levels and/or backlogs thereof. In fact, it would be beneficial if paging messages could be delayed when access response messages become too backed up.

In a communications system in which at least two types of messages share a given bandwidth and a first type of message has a higher priority than a second type of message in general situations, a method, system, and apparatus ensures that at least some of the second type of messages are able to be transmitted. When an overload condition is detected, one or more of the first type of messages are diverted (e.g., delayed, deleted, etc.). This enables at least one of the second type of messages to be transmitted.

In one embodiment, paging messages, which have a higher priority, share a preset capacity with access response messages, which have a lower priority in baseline situations. However, when the number of access response messages reach a predetermined number or when an access response message has been waiting for a predetermined period of time, an overload situation is detected. In response to the detected overload situation, one or more paging messages are diverted so that at least one/some of the backlogged access response messages may be transmitted.

In another embodiment, paging messages are diverted by priority. When an overload condition is first detected, the lowest priority paging messages are diverted in a first stage. If the overload condition persists for a period of time or worsens, then higher priority paging messages are diverted in succeeding stages. Likewise, when backlogged access response messages are enabled for transmission, they may be transmitted in an order from highest to lowest priority.

In yet another embodiment, the above described aspects and embodiments of the present invention may be advantageously realized in a wireless cellular communications system at a cell or sector cell level by an individual base station thereof, instead of requiring system-wide coordination.

The technical advantages of the present invention include, but are not limited to, the following. It should be understood that particular embodiments may not involve any, much less all, of the following exemplary technical advantages.

An important technical advantage of the present invention is that it enables bandwidth on a forward control channel to be flexibly allocated.

Another important technical advantage of the present invention is that it may flexibly allocate bandwidth in accordance with predetermined guidelines.

Yet another important technical advantage of the present invention is the ability to optimally allocate bandwidth of the forward control channel between paging messages and access response messages.

Yet another important technical advantage of the present invention is the ability to prioritize paging messages over access response messages while still providing at least a minimum capacity for the access response messages.

Yet still another important technical advantage of the present invention is that nothing need be changed during 'normal' traffic periods, but a minimum of traffic handling capacity is reserved during 'peak' periods.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1-7B of the drawings, like numerals being used for like and corresponding parts of the various drawings.

Figure 1:
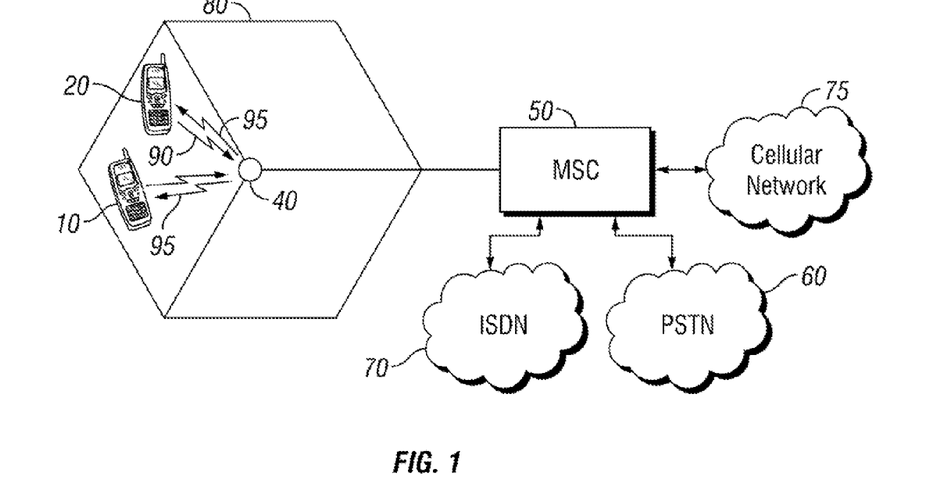
FIG. 1 illustrates a portion of an exemplary wireless system with which the principles of the present invention may be advantageously practiced.

Referring now to FIG. 1, a portion of an exemplary wireless system in which the principles of the present invention may be advantageously practiced is depicted generally at 1. The exemplary wireless system includes a base station 40 for interfacing with mobile terminals 10, 20 that are active within the base station's assigned cell 80. The base station 40 also communicates with an associated mobile switching center 50, which acts as an interface between the base station 40 and backbone networks, such as a Public Switched Telephone Network (PSTN) 60, an Integrated Services Digital Network (ISDN) 70, and other nodes within the (e.g., cellular) wireless network 75. In one embodiment, the base station 40 may be implemented with an omnidirectional antenna which enables the base station 40 to communicate with and control the mobile terminals 10, 20 within the entire cell 80. Alternatively, the base station 40 may be implemented with, for example, three directional antennas which divide the cell 80 into three sector cells as illustrated in FIG. 1 by dashed/dotted lines. The directional antennas enable the base station 40 to selectively communicate with and control mobile terminals within a single sector of the cell 80.

The exemplary wireless system depicted in FIG. 1 also includes a reverse (uplink) access channel 90 and a forward (downlink) control channel 95 which enable signaling information to be communicated between the base station 40 and the mobile terminals 10, 20 over an air interface. In practice, the forward control channel 95 is typically implemented as a point-to-multipoint communication channel that enables the base station 40 to broadcast control information and other signaling information, such as paging messages, access response messages, acknowledgment messages, etc. to all mobile terminals 10, 20 located within the base station's assigned cell 80. The reverse access channel 90, on the other hand, is typically implemented as a point-to-point communication channel that enables the mobile terminals 10, 20 to communicate signaling information, such as call origination request messages, acknowledgment messages, registration request messages, etc., to the serving base station 40.

Figure 2:
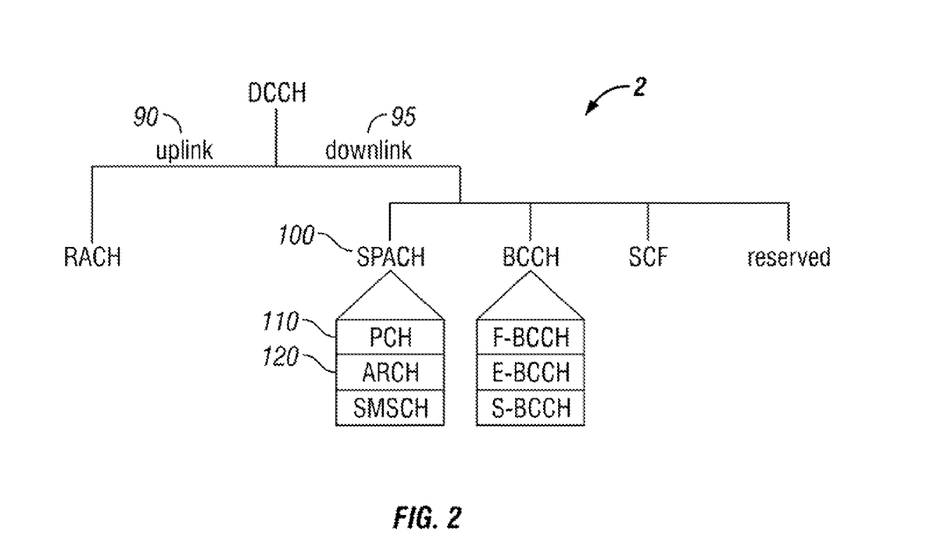
FIG. 2 illustrates logical control channels of an exemplary wireless system in accordance with one aspect of the present invention.

In a digital wireless communication system, the reverse access channel 90 and the forward control channel 95 are typically implemented as logical control channels within a Time Division Multiple Access (TDMA) frame structure. Referring now to FIG. 2, logical control channels of an exemplary wireless system in accordance with one aspect of the present invention are illustrated generally at 2. These exemplary logical control channels essentially correspond to the logical control channels of the Digital Control Channel (DCCH) specified by IS-136 standards. It should be emphasized that although this aspect of the present invention is described with reference to IS-136 specifications, persons of ordinary skill in the art will recognize that the principles of the present invention are not limited to wireless systems based on IS-136 specifications. Rather, the principles of the present invention are also applicable to wireless systems based on, for example, the Global System for Mobile Communications (GSM), the Personal Digital Cellular System (PDC), and other analog or digital wireless communication systems or standards in which different types of messages compete for the same limited bandwidth/capacity. Therefore, the exemplary logical control channels described below are for purposes of illustration, and not limitation.

With continuing reference to FIG. 2, the DCCH 2 is divided into a reverse (uplink) access channel 90 that communicates information from a mobile terminal to the base station, and a forward (downlink) control channel 95 that communicates information from the base station to mobile terminals. On the uplink of the DCCH 2, the reverse access channel 90 consists of a single Random Access Channel (RACH) that includes one or more time slots for enabling the mobile terminals 10, 20 to gain access to the wireless network and communicate signaling information to the serving base station 40.

The forward control channel 95 of the DCCH 2 is divided into a number of logical channels, depending on the type of information to be communicated. The SMS point-to-point messaging, paging and access response channel (SPACH) 100, for example, includes a Paging Channel (PCH) 110 for carrying system paging messages, an Access Response Channel (ARCH) 120 for providing system responses to mobile terminal queries and administration information, and a Short Message Service Channel (SMSCH) for carrying short message service (SMS) messages and over-the-air activation and programming. The Broadcast Control Channel (BCCH), on the other hand, includes a Fast Broadcast Channel (F-BCCH) for broadcasting information that mobile terminals need immediately, such as the system ID and registration information; an Extended Broadcast Control Channel (E-BCCH) for providing information that is less time critical, such as neighbor cell lists; and a Service Broadcast Control Channel (S-BCCH) for providing broadcast messaging services. Finally, the Shared Channel Feedback (SCF) channel carries information on the downlink that is used to provide a collision-prevention mechanism on the uplink.

Figure 3:
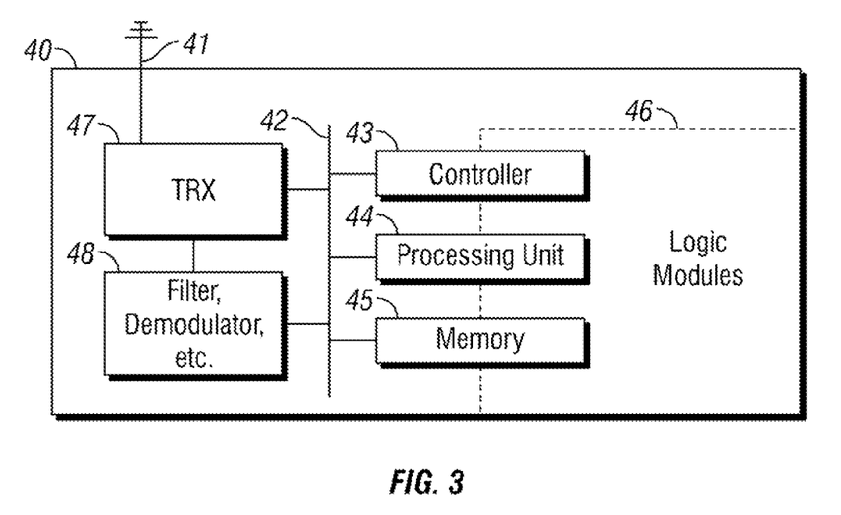
FIG. 3 illustrates an exemplary base station in accordance with the present invention.

Referring now to FIG. 3, an exemplary base station in accordance with the present invention is illustrated. An antenna 41 of the base station 40 receives signals and forwards them to a transceiver (TRX) 47. The TRX 47 may forward the signals to filters, demodulators, etc. 48 for further (e.g., baseband) processing. The TRX 47 and the filters, demodulators, etc. 48 may be connected to a bus 42, which interconnects various elements of the base station 40. A controller 43, a processing unit 44, and a memory 45, for example, may also be connected to the bus 42. It should be noted that two separate processors (e.g., a controller 43 and a processing unit 44) are not both necessary for an embodiment of the present invention. However, many processors (e.g., one, two, three, or more processors) may alternatively be present within the base station 40.

One or more logic modules 46 may also be part of the base station 40. The one or more logic modules 46 may be designed, programmed, etc. to effectuate the principles of the present invention. In other words, the one or more logic modules 46 may be software residing in the memory 45 (or another memory (not shown) that may program the processing unit 44 to implement the principles of the present invention. Alternatively, the one or more logic modules 46 may be hardware embodied in the controller 43 (e.g., and application specific integrated circuit (ASIC)) that implements the principles of the present invention. Other hardware, software, firmware, some combination thereof, etc. one or more logic modules 46 alternatives are also within the scope of the present invention for controlling/effectuating the functions and/or operations of the base station 40, including those corresponding to the principles of the present invention.

In wireless network systems based on TIA/EIA-136, for example, paging messages intended for mobile terminals are sent over the PCH 110 (of FIG. 2) of the DCCH 2. In order to save battery power in mobile terminals, paging messages are scheduled in such a way that mobile terminals only need to listen to the DCCH 2 when the PCH 110 is active. Consequently, it is important that the mobile terminals are synchronized to the base station so that a mobile terminal does not miss its own paging messages. When there are no paging messages to send, the SPACH 100 may be used for other messages, such as access response messages on the ARCH 120. Because the interval between paging opportunities for a specific mobile terminal is fixed (e.g., a multiple of 1.28 seconds, the period of a superframe in TIA/EIA-136, for one embodiment), the paging messages on the PCH 110 are given priority over other messages, such as access response messages on the ARCH 120. This prioritization reduces call set-up time.

Figure 4:
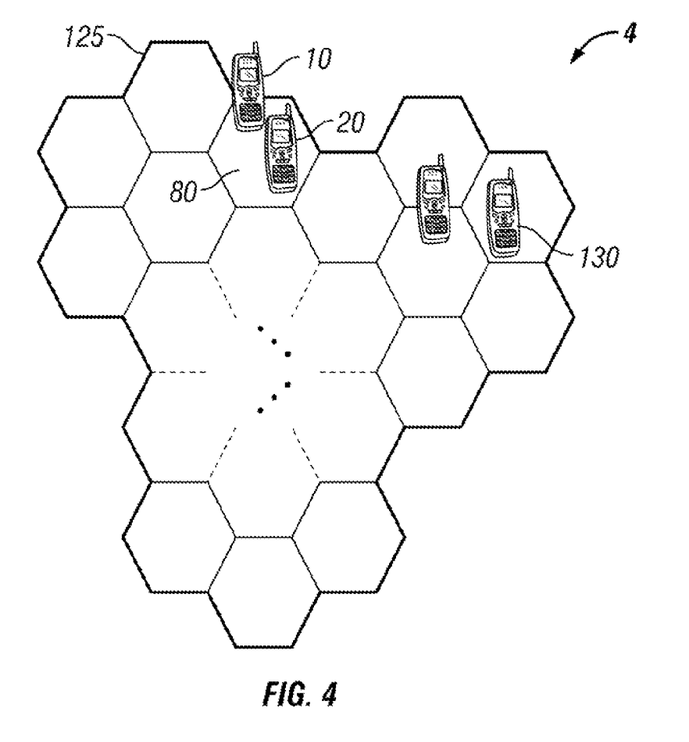
FIG. 4 illustrates an exemplary location area of the exemplary wireless system of FIG. 1.

Referring now to FIG. 4, an exemplary location area of the exemplary wireless system of FIG. 1 is illustrated generally at 4. Wireless network systems are structured in paging areas 125 (e.g., a location area), each of which may be composed of, for example, 40 to 60 base stations (e.g., 40 to 60 omnidirectional cells, 120 to 180 three-sector cells, etc.). A mobile terminal 10, 20 is known by the system to be within a particular paging area 125 due to the mobile terminal's registration when arriving (or being activated) therein. When an incoming call to a mobile terminal 10, 20 is detected by the system, a paging message is sent to all base stations 40 (of FIG. 1) in the paging area 125. Consequently, each single base station 40 (of the 40 to 60 base stations) of the paging area 125 carries a high load of paging messages that are intended for mobile terminals that are camping on other base stations. For example, an incoming call to a mobile terminal 130 causes the base station 40 of the cell 80 to transmit a page, even though the mobile terminal 130 is in a different cell.

Prioritizing paging over access responses, as described above, works well under normal load conditions; however, at a high load, there are so many paging messages being transmitted over the PCH 110 that there is no opportunity to transmit access response messages over the ARCH 120. In other words, all of the capacity of the SPACH 100 is occupied by paging messages, so no access response messages can be sent. This is especially unfortunate inasmuch as messages on the ARCH 120 are almost always sent to a mobile terminal that is actually listening to the DCCH 2 (e.g., because the mobile terminal initiated the exchange by requesting some kind of access to the wireless network). In practice, at least during high load situations, traffic channel messages (sent over the ARCH 120), which are intended, for example, for a mobile terminal 10 already in the process of setting up a call with the base station 40 of the cell 80, will not be sent due to their lower priority with respect to paging messages. These paging messages, which are being sent in lieu of access response messages, may even be to mobile terminals (e.g., the mobile terminal 130) that are not even listening to the base station 40 of the cell 80. However, keeping paging messaging at a higher priority than access response messaging is important and is preferably maintained, except in high load situations.

Figure 5:
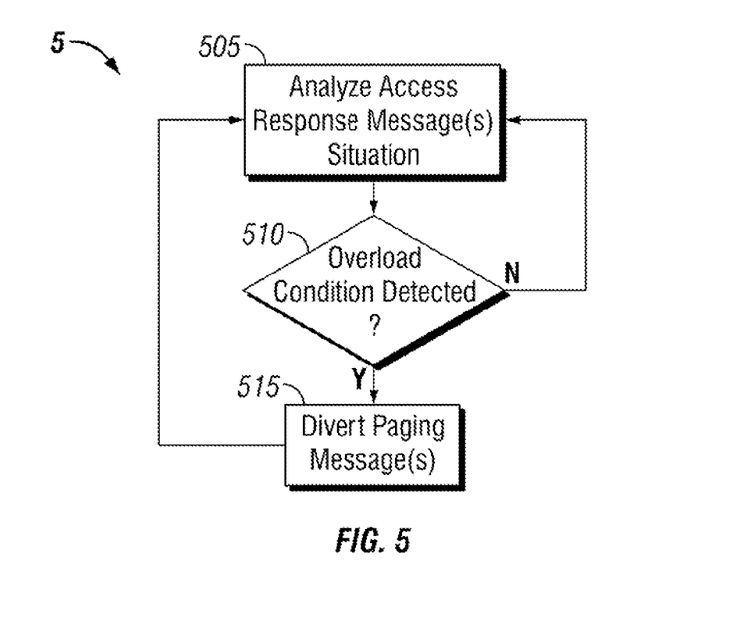
FIG. 5 illustrates an exemplary method in flowchart form in accordance with the present invention.

Referring now to FIG. 5, an exemplary method in flowchart form in accordance with the present invention is illustrated generally at 5. In accordance with certain embodiments of the present invention, the paging load on a given base station is reduced when it reaches a level where the base station is unable to adequately send access response messages. In accordance with the present invention, the wireless network (e.g., an individual base station at the cell/sector cell level)

regulates the transmission of pages and access responses on the PCH 110 and the ARCH 120, respectively, when detecting an overload condition.

The flowchart 5 reflects a process that may be effectuated by a base station (e.g., the base station 40 using the one or more logic modules 46) in a wireless network. It should be noted that the data analysis, decision making, etc. in accordance with the present invention may also be accomplished elsewhere in the network, such as at the MSC 50. The base station analyzes the access response message(s) situation (step 505). The base station next determines whether or not an overload condition is detected (step 510). (Determining when an overload condition exists is described in further detail hereinbelow.) If an overload condition is not detected (at step 510), then the base station may again analyze the access response message(s) situation (step 505). If, on the other hand, an overload condition is detected (at step 510), then the base station diverts paging message(s) (step 515). The base station may divert a paging message by delaying or deleting the paging message. If the paging message is delayed, then it may be held (e.g., queued in the memory 45) until the overload condition subsides (and then it may be sent) or until the paging message times out (and then it should no longer be sent).

In accordance with certain embodiments of the present invention, the paging message(s) (e.g., from step 515) may be diverted according to a prioritized order. In other words, the least important paging messages are diverted first. If the overload condition subsequently subsides, then the diverted messages (e.g., if delayed) may, for example, be sent. If the overload condition does not subsequently subside within a predetermined time period, or the overload condition grows increasingly worse, then the next least important messages may be diverted. This prioritization ramping scheme may be continued until paging messages with the highest priority are being diverted. Likewise, in accordance with certain embodiments of the present invention, access response messages may be transmitted from the base station on the ARCH 120 in a prioritized order (e.g., from most important to least important) during, for example, overload conditions.

Figure 6A:
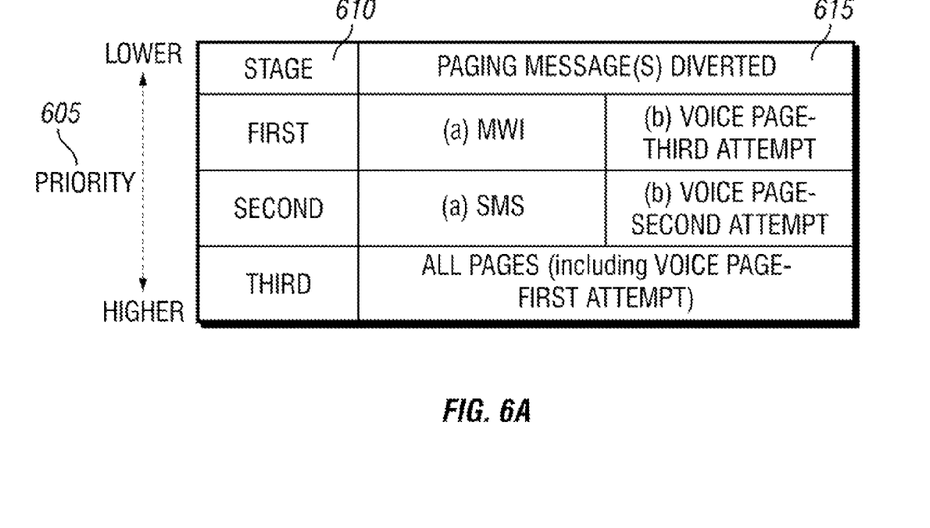
FIG. 6A illustrates an exemplary prioritization for paging messages in accordance with the present invention.

Referring now to FIG. 6A, an exemplary prioritization for paging messages in accordance with the present invention is illustrated generally at 6A. As shown at table 6A, paging messages may be assigned various priority levels 605 (e.g., selected from seven (7) different priority levels) and diverted in increasing stages 610. As the overload condition (i) continues for a predetermined period of time or (ii) worsens to an overload condition plus a threshold, more paging messages are diverted 615 as an embodiment progress through the exemplary three stages. For example, if message waiting indicator (MWI) pages and third attempt voice pages are being diverted in the first stage 610, but the overload condition does not abate, then short messages service (SMS) pages and second attempt voice pages can also be diverted in a second stage 610. The higher priority first attempt voice pages may also eventually need to be diverted in a third stage 610. It should be understood that other stages 610 and other priorities 605, as well as other (diverted) paging messages 615, may be incorporated into the principles of the present invention.

Figure 6B:
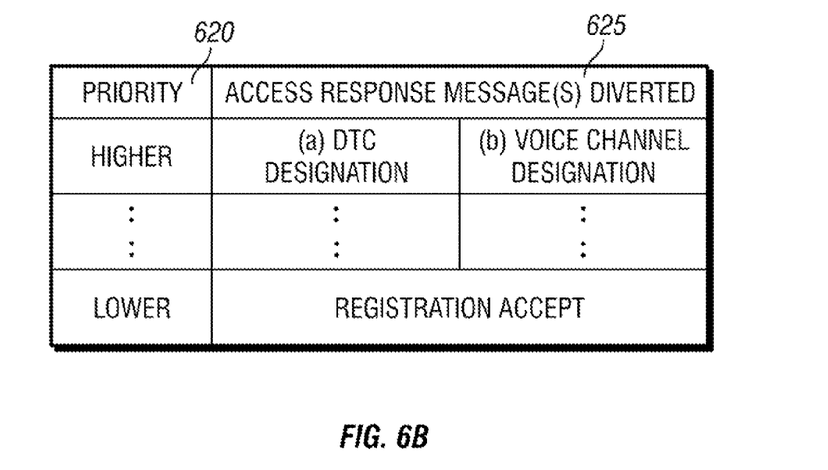
FIG. 6B illustrates an exemplary prioritization for access response messages in accordance with the present invention.

Referring now to FIG. 6B, an exemplary prioritization for access response messages in accordance with the present invention is illustrated generally at 6B. As shown at table 6B, in parallel with the prioritized, multi-stage approach to diverting paging messages (as shown in FIG. 6A), the backlog of access response messages may be transmitted 625 according to an exemplary priority 620. For example, digital traffic channel (DTC) designation and voice channel designation access response messages may be transmitted on the ARCH 120 using the first available bandwidth of the SPACH 100. When additional capacity becomes (or is made) available on the SPACH 100, registration accept access response messages may be transmitted on the ARCH 120. It should be understood that other priorities 620, as well as other (transmitted) access response messages 625, may be incorporated into the principles of the present invention.

Figure 7:
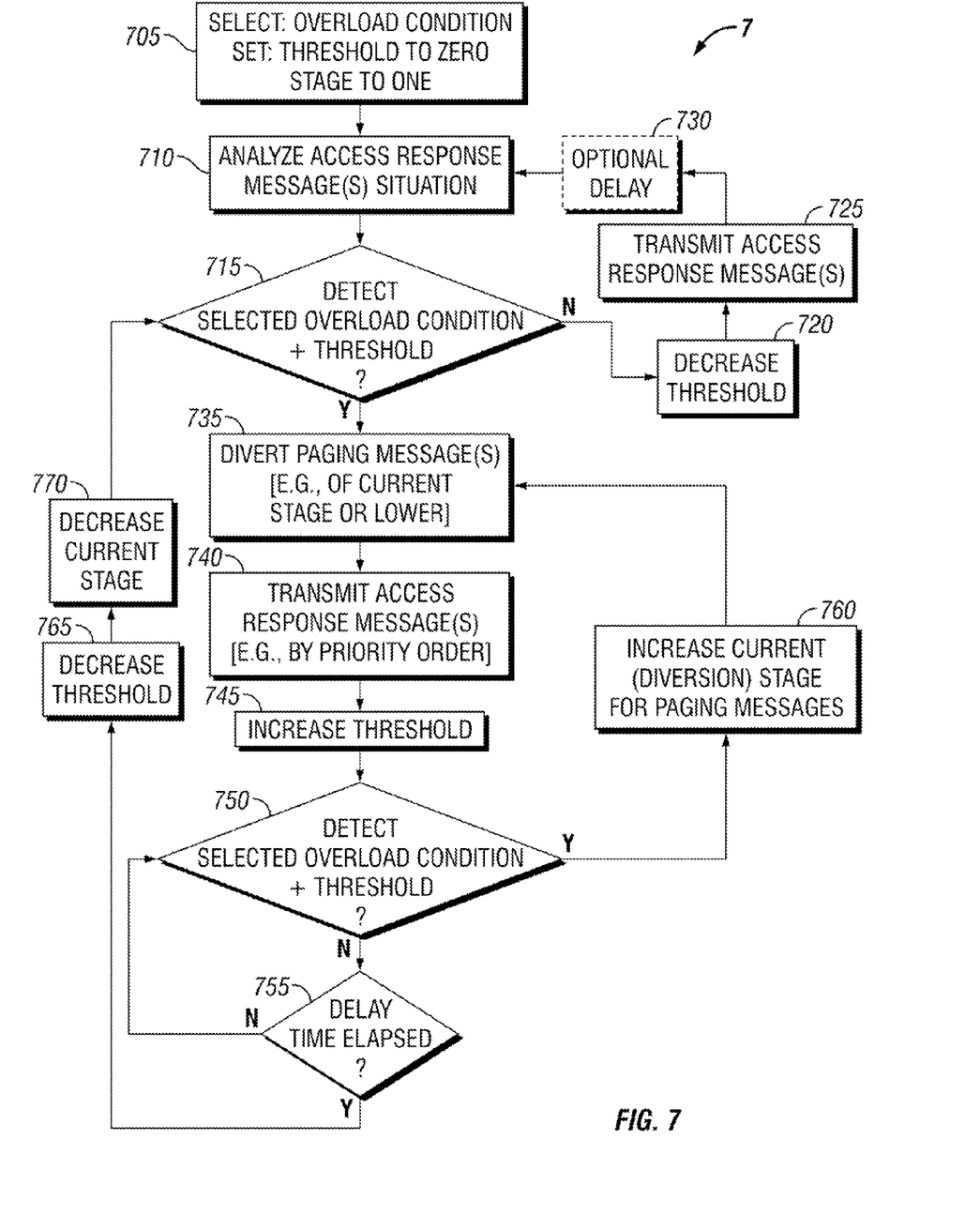
FIGS. 7, 7A, and 7B illustrate another exemplary method in flowchart form in accordance with the present invention.
Figure 7A:
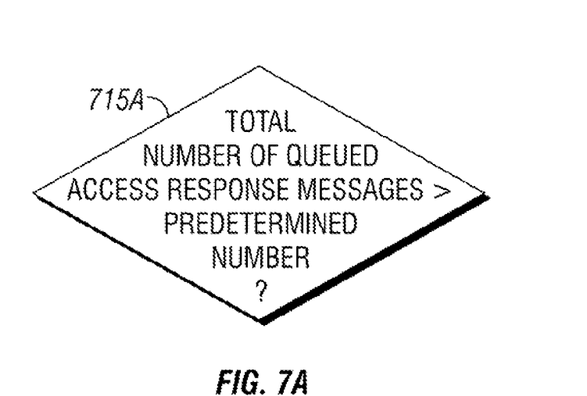
Figure 7B:
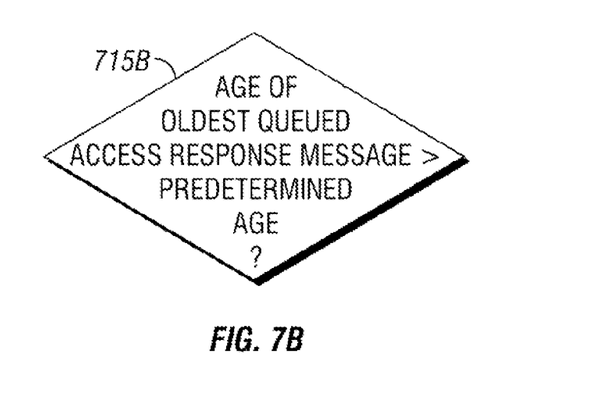

Referring now to FIGS. 7, 7A, and 7B, another exemplary method in flowchart form in accordance with the present invention is illustrated generally at 7. Flowchart 7 illustrates additional exemplary details of a process a wireless network system (e.g., at a base station) may undergo in order to ensure that messages that have a lower priority (e.g., access response messages) are granted at least a portion of bandwidth that is shared with messages that have a higher priority (e.g., paging messages). The process may involve two main phases. In a first phase, an overload situation is detected. In a second phase, the bandwidth sharing is regulated so as to permit the lower priority messages to be transmitted.

Initially, an overload condition is selected, a threshold is set to zero, and a stage is set to one (step 705). The access response message situation is analyzed (step 710). In other words, depending on the relevant overload condition(s) selected (at step 705), the number of queued access response messages is ascertained, the age of the oldest queued access response message is ascertained, both the relevant number and age are ascertained, etc. Next, whether or not the selected overload condition plus the threshold is met (and/or exceeded) is detected (step 715). In other words, whether or not the total number of queued access response messages is greater than a predetermined number may be detected/determined (step 715A of FIG. 7A). The predetermined number may correspond to, for example, five (5) access response messages, which is selected from an exemplary range of zero (0) to ten (10) access response messages. Alternatively, whether or not the age of the oldest queued access response message is greater than a predetermined age may be detected/determined (step 715B of FIG. 7B). The predetermined age may correspond to, for example, 1.28 seconds (a superframe in TIA/EIA-136 systems), which is selected from an exemplary range of zero (0) to two (2) seconds. In yet another alternative, detection of either condition can signify an overload situation. In other words, detection of a condition in accordance with either of steps 715A and 715B can trigger a limitation on the transmission of paging messages. In still yet another alternative, detection of both conditions simultaneously may be required. It should be understood that other criterion/criteria can alternatively be used in accordance with the present invention.

If a selected overload condition (plus a threshold) is not detected (at step 715), then the threshold is decreased (but not below zero) (step 720), and access response message(s) may be transmitted (step 725). After an optional delay (step 730), the access response message situation may be re-analyzed (step 710). If, on the other hand, a selected overload condition (plus a threshold) is detected (at step 715), then paging messages are diverted (as explained hereinabove) in accordance with the current stage or lower (step 735). An exemplary range of paging message diversion stages is explained hereinabove with reference to FIG. 6A. For example, if the current stage is the first stage, then MWI and third attempt voice pages are diverted. Because at least some paging messages are probably now being diverted, additional bandwidth on the SPACH 100 may be available. Transmission of access response message(s) (or at least an attempt to do so) follows (step 740). The transmissions (or attempts thereof) may be organized according to priority. An exemplary access response message transmission prioritization is explained hereinabove with reference to FIG. 6B. It should be noted that the transmission of access response message(s) in step 725 may be prioritized as well.

In the flowchart 7 embodiment of the present invention, the threshold is increased (step 745) (e.g., the threshold increases from zero (0) to one (1) such that the number of queued messages increases from five (5) to six (6) and/or the threshold increases 0.07 seconds such that the age of the oldest queued message is increased from 1.28 to 1.35). This principle of the present invention enables the detection of an increasing backlog of access response messages, even after some regulation (e.g., some diversion of paging messages has been engaged). Next, whether or not the selected overload condition plus the threshold is met (and/or exceeded) is detected (step 750). In other words, whether or not the total number of queued access response messages is greater than an increased predetermined number may be detected, whether or not the age of the oldest queued access response message is greater than an increased predetermined age may be detected, whether or not both or either condition is true may be detected, etc.

If the increased overload condition is not detected (at step 750), then it is determined whether a delay time has elapsed (step 755). The delay time enables the regulation of the SPACH 100 to continue for a preset period of time before returning to a non-regulated state. In an alternative embodiment (not specifically illustrated), the regulation continues until the originally (or at least previously) detected overload condition is eliminated by the paging message(s) diversion. Step 755 can therefore be substituted with another detection step that determines whether a selected overload condition plus a threshold (e.g., a threshold that is one level below the current threshold level of step 750) is detected. Continuing now with step 755, if the delay time has not elapsed, then it is determined again whether or not the selected overload condition plus the threshold is met (and/or exceeded) (step 750). If the increased overload condition is detected (at step 750), then the current paging message diversion stage is increased (step 760) (e.g., from the first to the second stage in table 6A). The flowchart 7 may then continue with step 735 while using the increased current stage.

Once a delay time does elapse (at step 755) (e.g., without an increased overload condition developing and being detected (at step 750)), then the threshold is decreased by at least one level (step 765) and the current stage is decreased by at least one (step 770). (A simplifying alternative implementation for the flowchart 7 entails resetting both the threshold and the current stage after an overload condition has been overcome.) The flowchart 7 may then continue with step 715 while using the current stage and threshold. The flowchart 7 may also include a provision for ensuring that the current stage is reduced as it becomes apparent that the overload condition is and/or has subsided (e.g., similar to the step 720 for the threshold). In the alternative embodiment for step 755 as described hereinabove, the flowchart 7 may continue with steps 765 and 770 after the originally (or at least previously) detected overload condition has subsided as a result of the paging message(s) diversion (or other external factor(s) such as a reduction in incoming calls).

Although preferred embodiment(s) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for providing bandwidth to access response messages, comprising the steps of:
    analyzing a number of access response messages;
    determining whether the number of access response messages awaiting transmission meets a predetermined criterion; and
    if so,
        diverting at least one paging message.

2. The method according to claim 1, wherein said step of determining whether said access response message situation meets a predetermined criterion comprises the step of determining whether said number exceeds a predetermined threshold.

3. The method according to claim 2, wherein said predetermined threshold comprises five.

4. The method according to claim 1, wherein said step of analyzing an access response message situation comprises the steps of determining the number of access response messages that are awaiting transmission and determining an age of an oldest access response message that is awaiting transmission.

5. The method according to claim 1, wherein said step of diverting at least one paging message comprises the step of deleting said at least one paging message.

6. The method according to claim 1, wherein said step of diverting at least one paging message comprises the step of delaying said at least one paging message.

7. The method according to claim 6, wherein said step of delaying said at least one paging message comprises the step of delaying said at least one paging message until said access response message situation no longer meets said predetermined criterion or a predetermined period of time elapses.

8. The method according to claim 1, wherein said step of diverting at least one paging message comprises the step of diverting a plurality of paging messages according to respective priority levels of said plurality of paging messages.

9. The method according to claim 8, further comprising the steps of:
    repeating said steps of analyzing and determining; and
    diverting additional paging messages of said plurality of paging messages, said additional paging messages associated with a higher priority level.

10. A base station enabled to provide capacity to access response messages, comprising:
    a transceiver;
    a processor;
    a memory; and
    at least one logic module operatively associated with said transceiver and interrelated to at least one of said processor and said memory, said at least one logic module configured to:
        analyze a number of access response messages;
        determine whether said number of access response messages awaiting transmission meets a predetermined criterion; and
        if so,
            divert at least one paging message.

11. The base station according to claim 10, wherein said at least one logic module is further configured to determine whether said number exceeds a predetermined threshold when determining whether said access response message situation meets said predetermined criterion.

12. The base station according to claim 11, wherein said predetermined threshold comprises five.

13. The base station according to claim 10, wherein said at least one logic module is further configured to determine an age of an oldest access response message that is awaiting transmission when analyzing said access response message situation.

14. The base station according to claim 10, wherein said at least one logic module is further configured to delete said at least one paging message when diverting said at least one paging message.

15. The base station according to claim 10, wherein said at least one logic module is further configured to delay said at least one paging message by storing said at least one paging message in said memory when diverting said at least one paging message.

16. The base station according to claim 15, wherein said at least one logic module is further configured to delay said at least one paging message until said access response message situation no longer meets said predetermined criterion or a predetermined period of time elapses when delaying said at least one paging message.

17. The base station according to claim 10, wherein said at least one logic module is further configured to divert a plurality of paging messages according to respective priority levels of said plurality of paging messages when diverting said at least one paging message.

18. The base station according to claim 17, wherein said at least one logic module is further configured to:
repeat the analysis and the determination; and
divert additional paging messages of said plurality of paging messages, said additional paging messages associated with a higher priority level.

19. A method for ensuring that lower priority messages are provided a minimum bandwidth in a wireless communications system, comprising the steps of:
providing lower priority messages and higher priority messages that share a given bandwidth;
transmitting higher priority messages;
determining whether a backlog of lower priority messages exists by comparing a number of backlogged lower priority messages to a predetermined overload number;
diverting at least one higher priority message responsive to an affirmative determination that said backlog of lower priority messages exists;
transmitting lower priority messages using bandwidth freed from said step of diverting.

20. The method according to claim 19, wherein said lower priority messages comprise access response messages and said higher priority messages comprise paging messages.

21. The method according to claim 19, wherein said step of determining whether a backlog of lower priority messages exists further comprises the steps of
comparing an age of an oldest backlogged lower priority message to a predetermined overload age.

22. The method according to claim 19, wherein said step of diverting at least one higher priority message responsive to an affirmative determination that said backlog of lower priority messages exists comprises the step of diverting a plurality of higher priority messages in an order determined according to a selected priority ranking.

23. The method according to claim 19, wherein said step of transmitting lower priority messages using bandwidth freed from said step of diverting comprises the step of transmitting a higher priority subset of said lower priority messages before transmitting a lower priority subset of said lower priority messages.

24. A method for temporarily prioritizing access response messages over paging messages, comprising the steps of:
detecting whether a control channel is overloaded by ascertaining a number of access response messages awaiting transmission for an access response channel;
regulating said control channel by reducing the bandwidth of said control channel that is consumed by a paging channel; and
transmitting at least one access response message on said access response channel.

\* \* \* \* \*